(12) United States Patent
Heo

(10) Patent No.: US 11,958,539 B2
(45) Date of Patent: Apr. 16, 2024

(54) RACK BAR SUPPORT APPARATUS OF VEHICLE STEERING APPARATUS

(71) Applicant: HL MANDO CORPORATION, Pyeongtaek-si (KR)

(72) Inventor: Seongmoo Heo, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 168 days.

(21) Appl. No.: 17/299,424

(22) PCT Filed: Nov. 6, 2019

(86) PCT No.: PCT/KR2019/014944
§ 371 (c)(1),
(2) Date: Jun. 3, 2021

(87) PCT Pub. No.: WO2020/116797
PCT Pub. Date: Jun. 11, 2020

(65) Prior Publication Data
US 2022/0055682 A1    Feb. 24, 2022

(30) Foreign Application Priority Data
Dec. 3, 2018   (KR) .................. 10-2018-0153355

(51) Int. Cl.
*B62D 3/12*      (2006.01)
*F16H 19/04*     (2006.01)
*F16H 55/28*     (2006.01)

(52) U.S. Cl.
CPC ............ *B62D 3/126* (2013.01); *F16H 55/28* (2013.01); *F16H 2019/046* (2013.01)

(58) Field of Classification Search
CPC .......... B62D 3/126; B62D 3/12; B62D 3/123; F16H 55/28; F16H 2019/046
(Continued)

(56) References Cited

U.S. PATENT DOCUMENTS 5,931,046 A * 8/1999 Phillips ................. B62D 3/123
74/498
8,327,731 B2 * 12/2012 Sung ..................... B62D 3/123
74/409
(Continued)

FOREIGN PATENT DOCUMENTS

| CN | 104675945 B | * | 5/2018 | ............... B62D 3/12 |
| JP | 2015044486 A | * | 3/2015 | ............. B62D 3/123 |

(Continued)

OTHER PUBLICATIONS

English Translation and Original Document, Kim Heung, KR 20110096807-A, Filed Feb. 2010, Retrieved and translated May 2, 2023 (Year: 2010).*

(Continued)

*Primary Examiner* — Paul N Dickson
*Assistant Examiner* — Caitlin Anne Miller
(74) *Attorney, Agent, or Firm* — Hauptman Ham, LLP

(57) ABSTRACT

According to the present embodiments, noise can be reduced by compensating for clearance caused by the wear of a rack bar support member, assembly convenience can be improved by simplifying a structure, and an installation space can be easily ensured by reducing the overall size of a steering apparatus.

17 Claims, 12 Drawing Sheets

(58) Field of Classification Search
USPC .................................. 280/93.514, 93.515
See application file for complete search history.

(56) References Cited

U.S. PATENT DOCUMENTS

| | | | |
|---|---|---|---|
| 9,815,489 B2* | 11/2017 | Lingemann | F16H 55/283 |
| 11,613,300 B2* | 3/2023 | Son | B62D 3/123 |
| | | | 280/93.514 |
| 2007/0296172 A1* | 12/2007 | Gunther | F16C 29/02 |
| | | | 280/93.514 |
| 2009/0166994 A1* | 7/2009 | Span | B62D 3/12 |
| | | | 280/93.514 |
| 2014/0260719 A1* | 9/2014 | Bae | F16H 55/283 |
| | | | 74/30 |
| 2015/0166098 A1 | 6/2015 | Lingemann | |

FOREIGN PATENT DOCUMENTS

| | | | | |
|---|---|---|---|---|
| KR | 1995-0008992 B1 | | 8/1995 | |
| KR | 20-0137413 Y1 | | 3/1999 | |
| KR | 10-2006-0132914 A | | 12/2006 | |
| KR | 10-2011-0096807 A | | 8/2011 | |
| KR | 20200050263 A | * | 11/2018 | ............. B62D 3/126 |

OTHER PUBLICATIONS

International Search Report dated Feb. 18, 2020 for corresponding international application No. PCT/KR2019/014944.
Written Opinion issued for corresponding International Patent Application No. PCT/KR2019/014944 dated Feb. 18, 2020.

* cited by examiner

RACK BAR SUPPORT APPARATUS OF VEHICLE STEERING APPARATUS

CROSS-REFERENCE TO RELATED APPLICATION

The present application is a national stage filing under 35 U.S.C § 371 of PCT application number PCT/KR2019/014944 filed on Nov. 6, 2019 which is based upon and claims the benefit of priorities to Korean Patent Application No. 10-2018-0153355 filed on Dec. 3, 2018, in the Korean Intellectual Property Office. Both of the aforementioned applications are hereby incorporated by reference in their entireties.

TECHNICAL FIELD

The present embodiments relate to a rack bar support device of a vehicle steering system, and more particularly, to a rack bar support device of a vehicle steering device that may reduce noise by compensating for the gap between the rack bar and the pinion shaft, increase assembly convenience by simplifying the structure, and easily secure an installation space by reducing the overall size of the steering device.

BACKGROUND ART

The vehicle steering device is a device for changing the driving direction of the vehicle as intended by the driver and typically converts the driver's steering wheel maneuver into a linear motion of the rack bar so as to change the center of rotation at which the front wheels of the vehicle rotate.

A pinion shaft with a pinion gear is formed at an end of the steering shaft which is rotated by the driver's steering wheel operation, and the rack bar has a rack gear that is engaged with the pinion gear. Thus, when the driver maneuvers the steering wheel, the pinion shaft and the rack bar are engaged with each other to convert the rotation of the steering shaft into a linear motion of the rack bar, allowing the front wheels of the vehicle to rotate.

In this case, a rack bar support device is provided to support the rack bar towards the pinion shaft so as to compensate for the gap and hence achieve proper engagement between the rack bar and the pinion shaft. Such a rack bar support device is provided with a support yoke on the opposite side of the pinion shaft, which is supported by the rack bar.

The conventional rack bar support device includes a spring that is supported by the rear surface of the support yoke to bring the support yoke in tight contact with the rack bar, a yoke plug to support the spring, and a lock nut to fasten the yoke plug so as to prevent the support yoke from wear and weakening supportability due to linear movement of the rack bar. Such a conventional rack bar support device suffers from reductions in the elastic force of the spring over time, a failure to sufficiently compensate for the gap between the pinion shaft and the rack bar to thus cause noise, inconvenience assembly arising as the spring is vertically assembled with the rack bar, and occupancy of a large space inside the vehicle.

DISCLOSURE

Technical Problem

The present embodiments have been conceived in light of the afore-mentioned background and aim to reduce noise by compensating for the gap due to wear to the rack bar support member, increase assembly convenience by simplifying the structure, and easily secure an installation space by reducing the overall size of the steering device.

Objects of the present embodiments are not limited thereto, and other objects will be apparent to one of ordinary skill in the art from the following description.

Technical Solution

According to the present embodiments, there may be provided a rack bar support device of a vehicle steering device, comprising a rack bar engaged with a pinion shaft, a guide member coupled to a housing and including a first inclined surface positioned opposite a rear surface of the rack bar, a rack bar support member including a yoke part supported on the rear surface of the rack bar and a second inclined surface abutting the first inclined surface, and an elastic member provided between the guide member and the rack bar support member to elastically support the rack bar support member in an axial direction.

Advantageous Effects

According to the present embodiments, it is possible to reduce noise by compensating for the gap due to wear to the rack bar support member, increase assembly convenience by simplifying the structure, and easily secure an installation space by reducing the overall size of the steering device.

MODE FOR INVENTION

Figure 1:
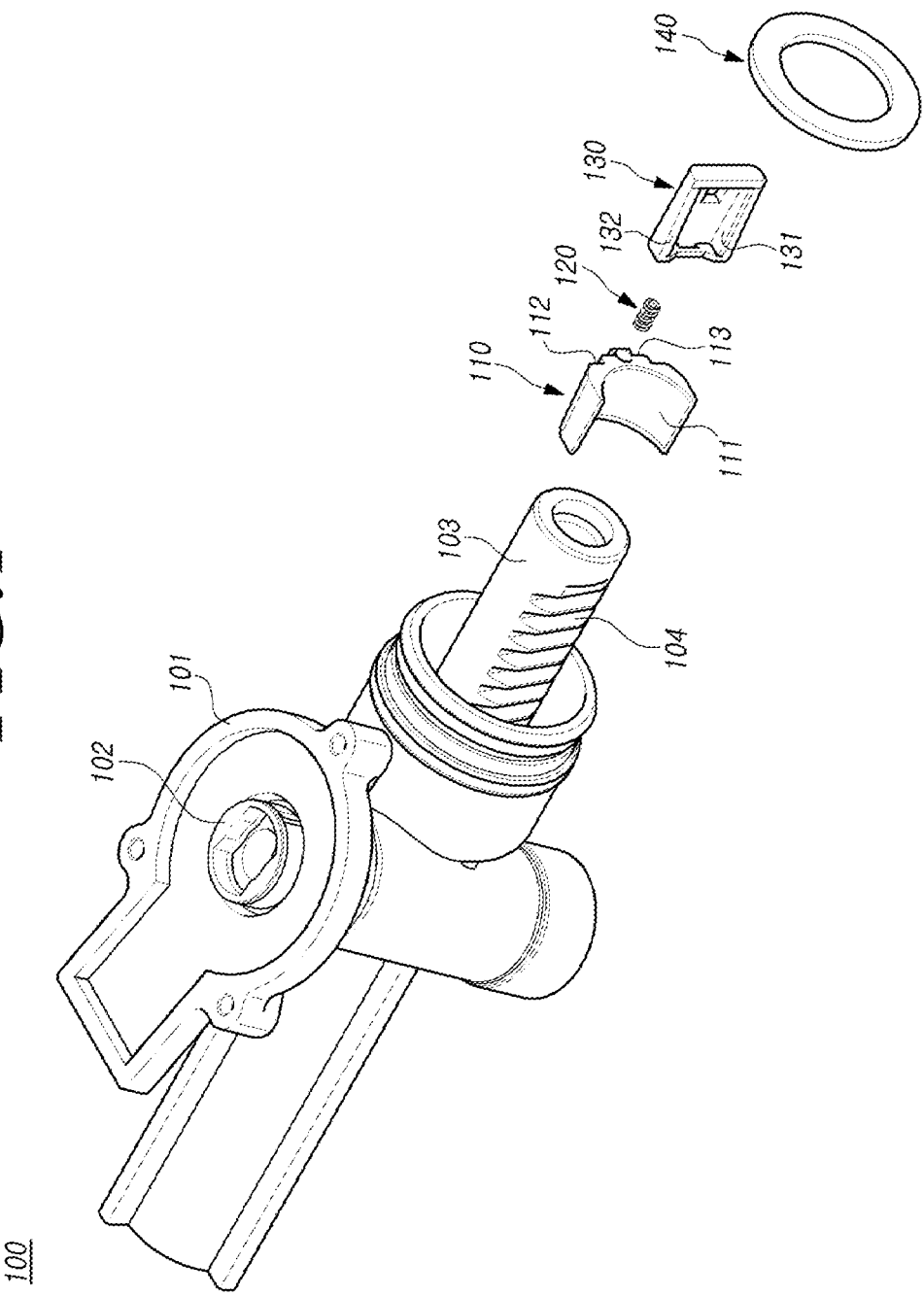
FIG. 1 is an exploded perspective view illustrating a rack bar support device of a vehicle steering device according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term. "may" fully encompasses all the meanings of the term "can".

Figure 2:
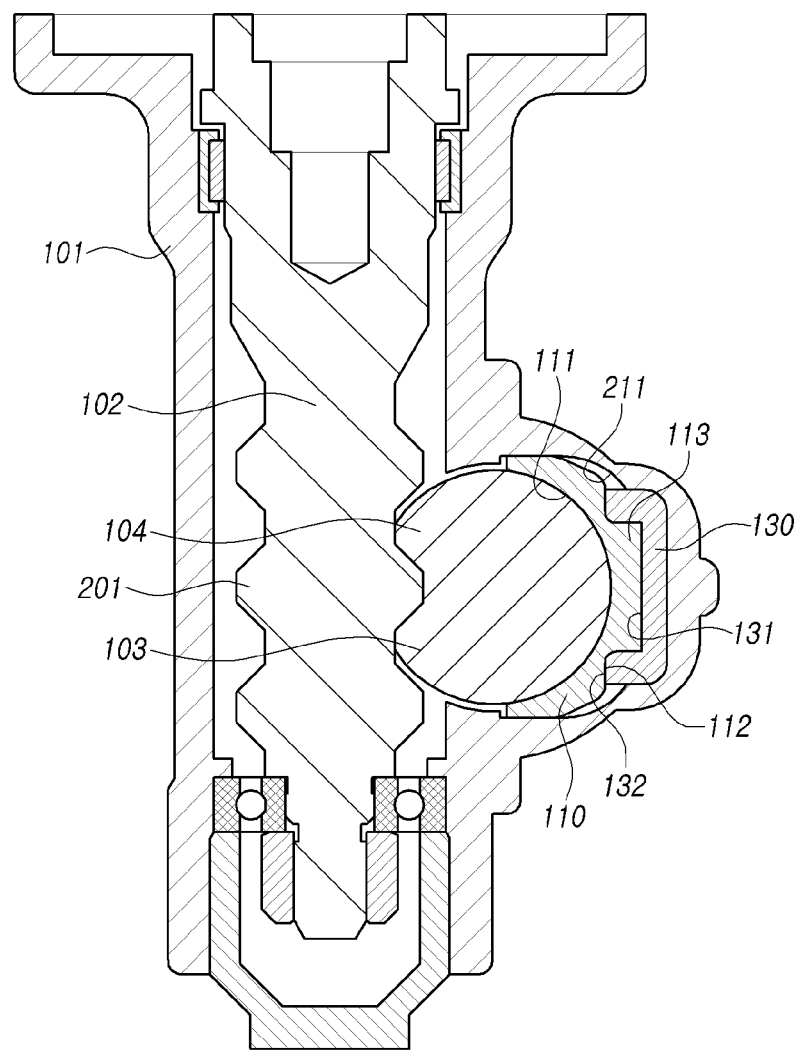
FIG. 2 is a cross-sectional view illustrating an assemble state of FIG. 1.
Figure 3:
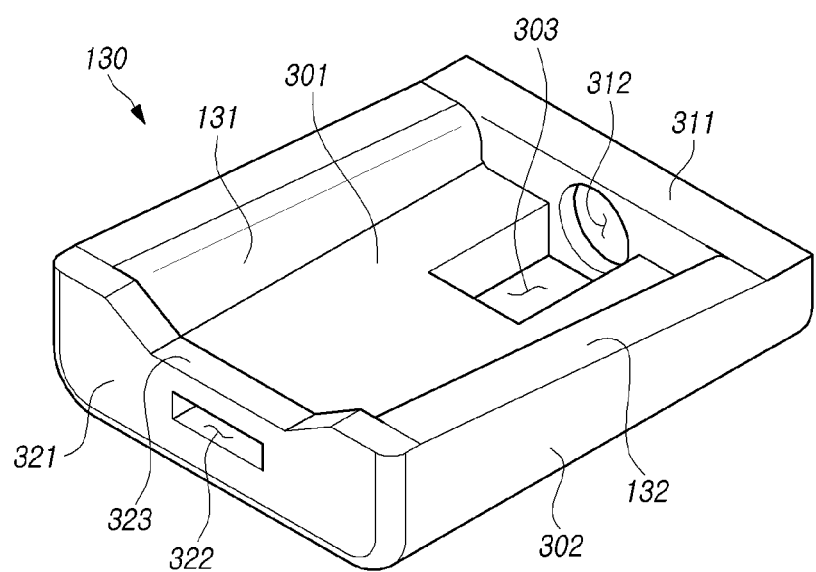
FIGS. 3 and 4 are perspective views illustrating a portion of FIG. 1.
Figure 4:
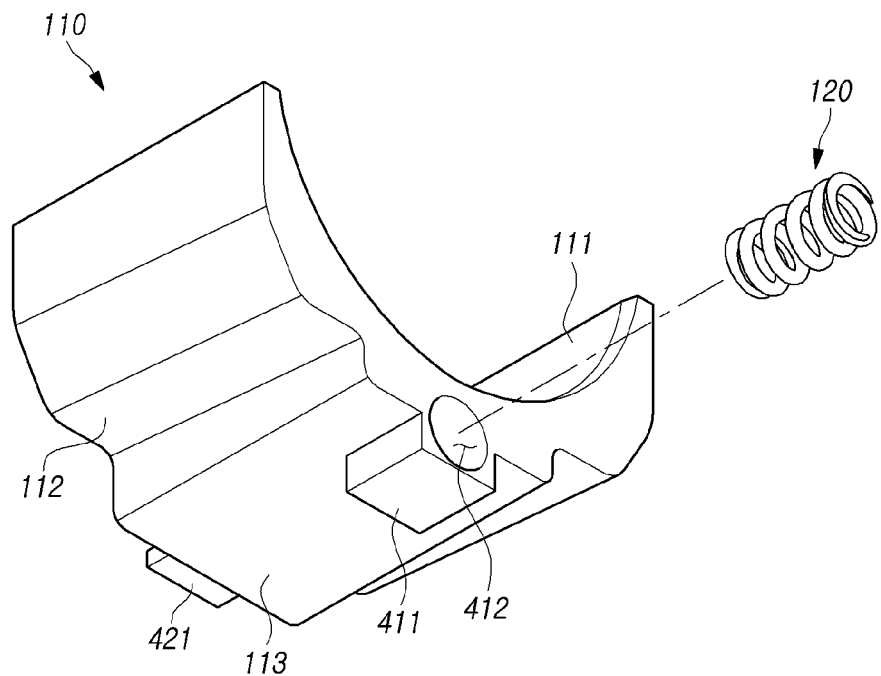
Figure 5:
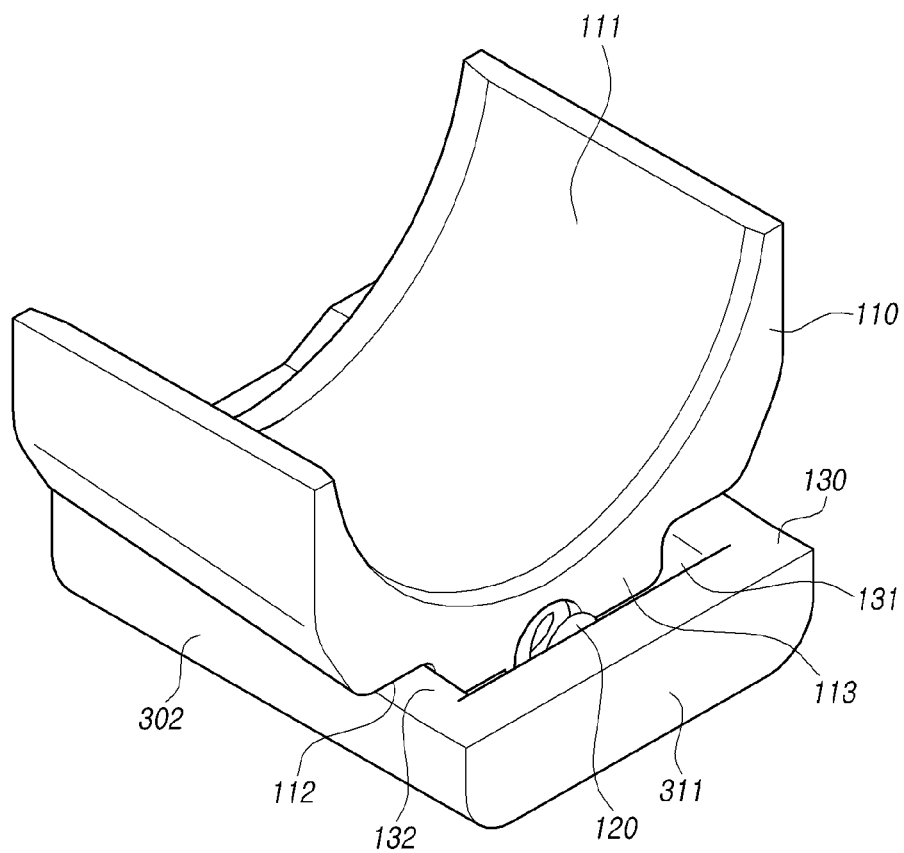
FIGS. 5 and 6 are perspective views illustrating a portion of FIG. 1.
Figure 6:
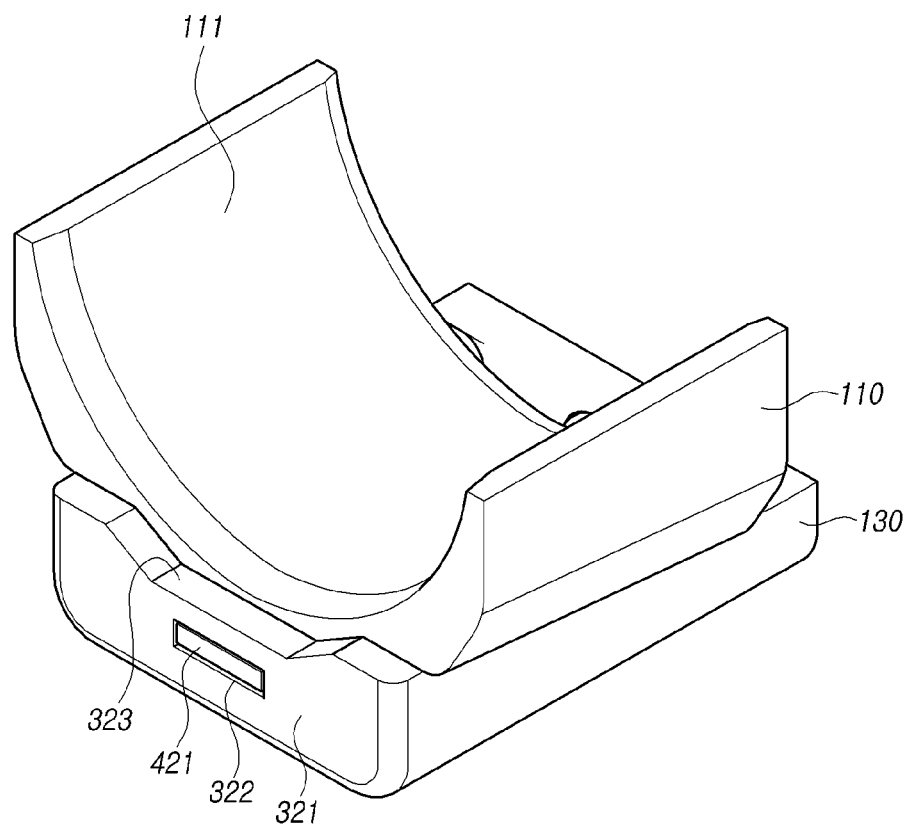
Figure 7:
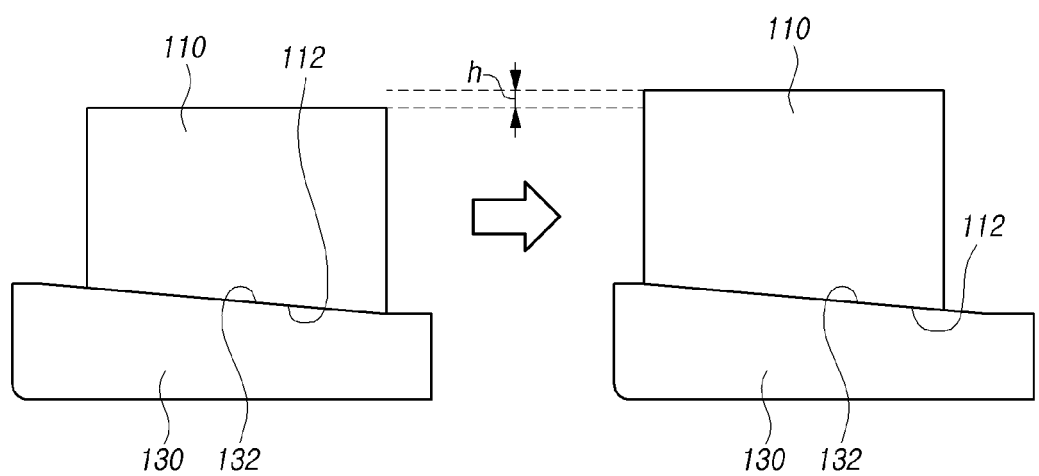
FIG. 7 is a cross-sectional view illustrating an operational state of a portion of FIG. 1.
Figure 8:
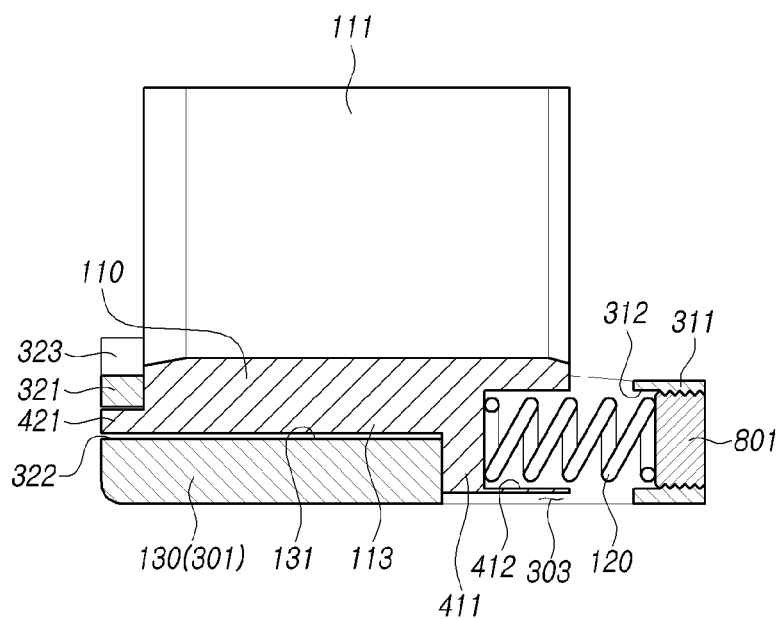
FIG. 8 is a cross-sectional view illustrating a portion of a vehicle steering device according to embodiments of the disclosure.
Figure 9:
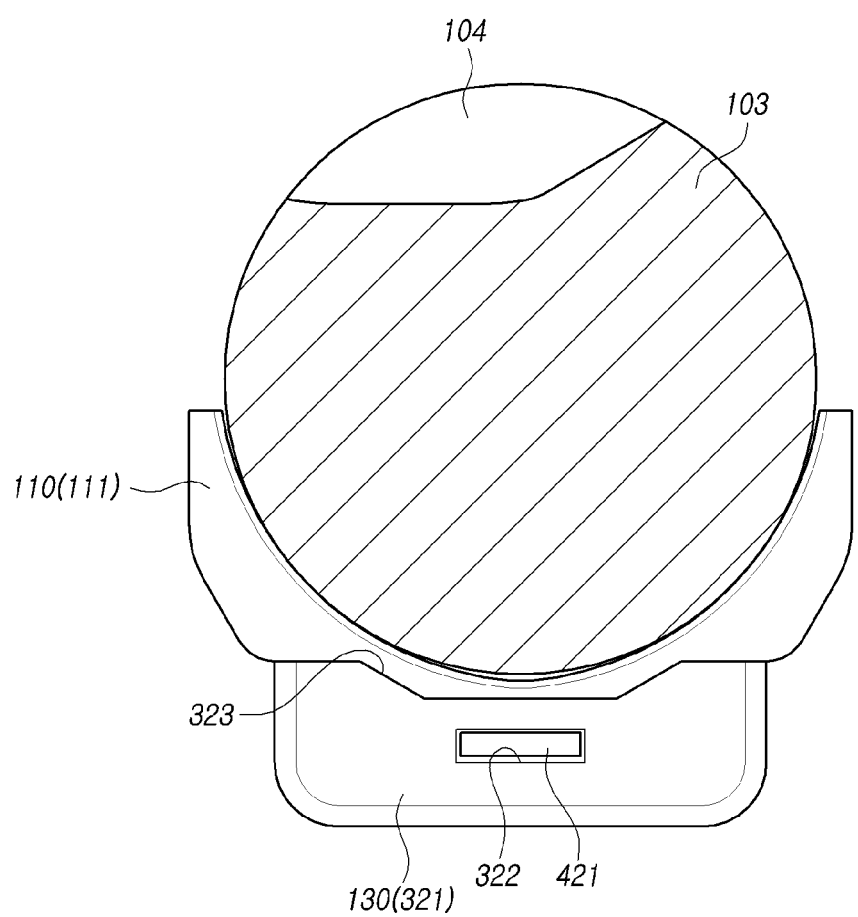
FIG. 9 is a side view illustrating a portion of FIG. 1.
Figure 10:
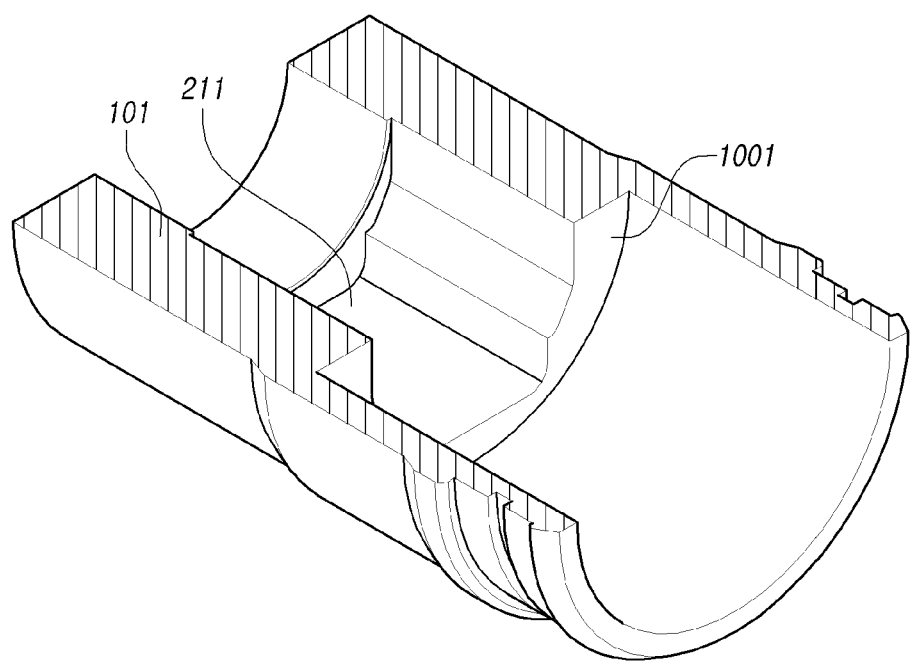
FIGS. 10, 11 and 12 are perspective views illustrating a portion of FIG. 1.
Figure 11:
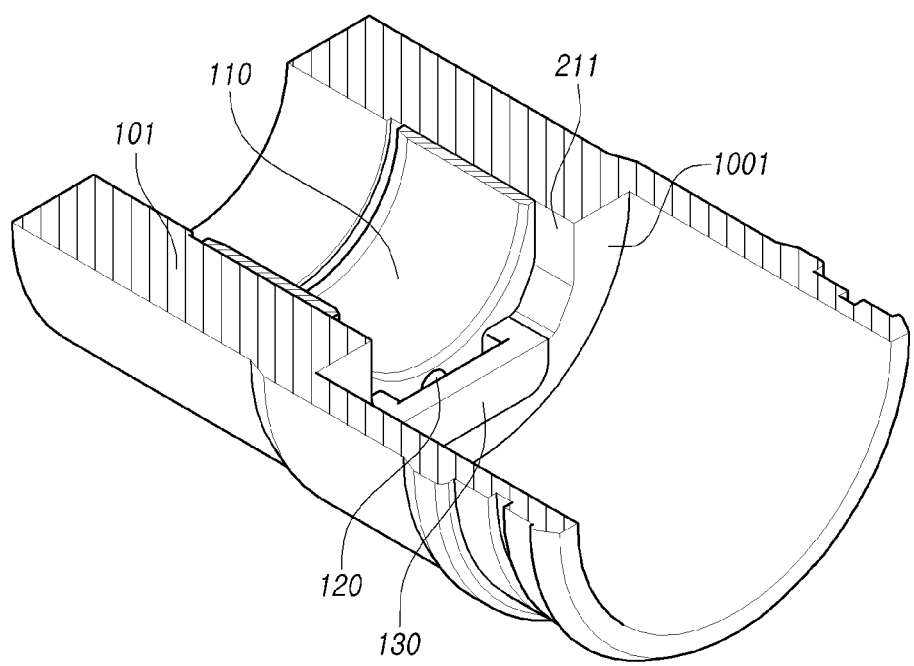
Figure 12:
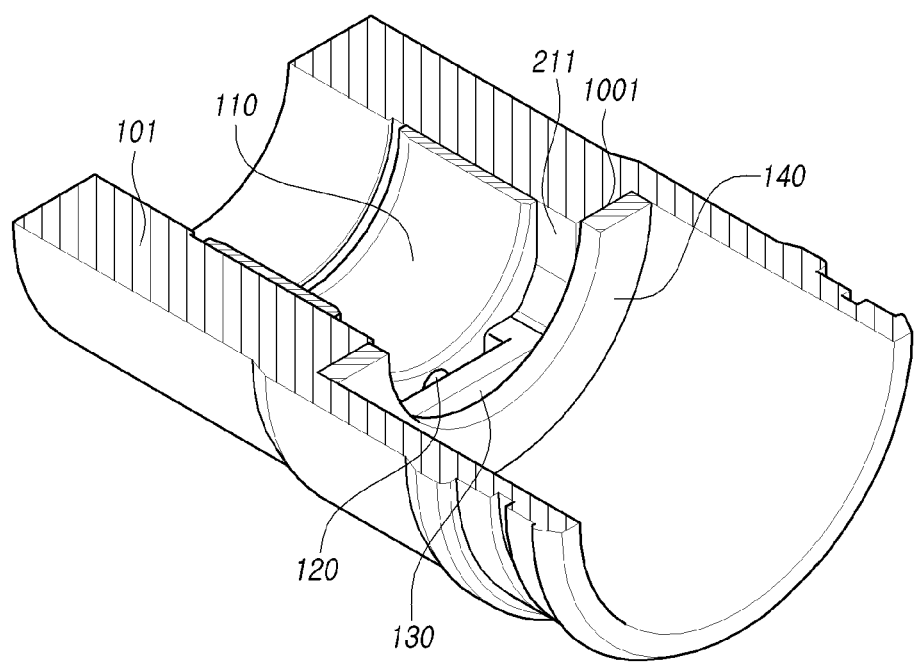

FIG. 1 is an exploded perspective view illustrating a rack bar support device of a vehicle steering device according to embodiments of the disclosure. FIG. 2 is a cross-sectional view illustrating an assemble state of FIG. 1. FIGS. 3 and 4 are perspective views illustrating a portion of FIG. 1. FIGS. 5 and 6 are perspective views illustrating a portion of FIG. 1. FIG. 7 is a cross-sectional view illustrating an operational state of a portion of FIG. 1. FIG. 8 is a cross-sectional view illustrating a portion of a vehicle steering device according to embodiments of the disclosure. FIG. 9 is a side view illustrating a portion of FIG. 1. FIGS. 10 to 12 are perspective views illustrating a portion of FIG. 1.

A description is made below with reference to FIGS. 1 and 2.

According to the present embodiments, a rack bar support device 100 of a vehicle steering device includes a rack bar 103 engaged with a pinion shaft 102, a guide member 130 coupled to a housing 101 and including a first inclined surface 132 positioned opposite a rear surface of the rack bar 103, a rack bar support member 110 including a yoke part 111 supported on the rear surface of the rack bar 103 and a second inclined surface 112 abutting the first inclined surface 132, and an elastic member 120 provided between the guide member 130 and the rack bar support member 110 to elastically support the rack bar support member 110 in an axial direction.

The pinion shaft 102 is connected to a steering shaft (not shown) that is rotated by a steering wheel (not shown), and is rotated by a driver's steering wheel maneuver.

As a rack gear 104 formed on the front surface of the rack bar 103 is engaged with a pinion gear 201 of the pinion shaft 102, the rack bar 103 is linearly moved back and forth inside the housing 101 by the rotation of the pinion shaft 102, rotating the front wheels of the vehicle and hence allowing the vehicle to be steered as the driver maneuvers the steering wheel.

To prevent noise due to a gap between the rack bar 103 and the pinion shaft 102 when the rack gear 104 and the pinion gear 201 are engaged with each other, the rack bar support member 110, the guide member 130, and the elastic member 120 support the rack bar 103 in the direction of being engaged with the pinion shaft 102 to thereby compensate for the gap.

In other words, the guide member 130 and the rack bar support member 110 are provided on the rear side of the rack bar 103 inside the housing 101, supporting the rack bar 103 in the direction of being engaged with the pinion shaft 102 and thus compensating for the gap between the rack bar 103 and the pinion shaft 102.

Meanwhile, the guide member 130, the rack bar support member 110, and the elastic member 120 form an assembly that is inserted into a mounting recess 211 in the axial direction and is provided inside the housing 101 and fastened to the housing 101 by a coupling member 140.

As compared with the conventional rack bar support device which has inconvenience in assembly of parts due to being provided in a direction perpendicular to the rack bar and in which the housing extends perpendicular to the axial direction of the rack bar to receive the spring, yoke plug, etc., the rack bar support device 100 of the vehicle steering device, according to the present embodiments, allows for a simplified structure, increased assembly convenience because it is assembled in the housing 101 in the same axial direction as the rack bar 103, and a reduction in the overall size of the steering device and an easier securing of an installation space since the housing 101 need not extend perpendicular to the rack bar 103.

Described below is such a structure in which the guide member 130, the rack bar support member 110, and the elastic member 120 form an assembly that is mounted inside the housing 101 by the coupling member 140.

The description goes on with reference to FIGS. 3 and 4.

The guide member 130 is coupled to the housing 101 and includes a first inclined surface 132 opposite the rear surface of the rack bar 103.

The first inclined surface 132 is formed to be inclined with respect to the axial direction. In other words, as the front-to-rear thickness of the guide member 130 increases from one end thereof in the axial direction to the opposite, the front surface of the guide member 130 gets closer to the rear surface of the rack bar 103

The rack bar support member 110 includes a yoke part 111 supported on the rear surface of the rack bar 103 and a second inclined surface 112 abutting the first inclined surface 132. In other words, the rack bar support member 110 is provided between the rack bar 103 and the guide member 130 (see FIG. 2).

The second inclined surface 112 is formed to correspond to, and thus abut, the first inclined surface 132. In other words, the front-to-rear thickness of the rack bar support member 110 increases from one end thereof in the axial direction to the opposite, so that the rear surface of the rack bar support member 110 gets farther away from the rear surface of the rack bar 103 from the opposite end to the end.

The rack bar support member 110 is required to be formed of a material that is resistant to wear due to friction between the rack bar 103 and the yoke part 111 and is less thermally elastic when the rack bar 103 moves linearly in the axial direction. For example, the rack bar support member 110 may be formed of engineering plastic materials, such as polyacetal (POM), polyamide (PA), polycarbonate (PC), polyimide (PI), or polybutylene terephthalate (PBT), or steel sintering or aluminum and zinc die-casting material, or a low-friction, abrasion-resistant material may be further provided on the inner surface of the yoke part 111.

The elastic member 120 is provided between the guide member 130 and the rack bar support member 110 to elastically support the rack bar support member 110 in the axial direction. The elastic force of the elastic member 120 is changed as the first inclined surface 132 and the second inclined surface 112 abut each other, so that the elastic member 120 supports the rack bar 103 in the direction of being engaged with the pinion shaft 102.

As the elastic member 120, various springs, such as a coil spring or a leaf spring, may be used. An example in which a coil spring is used as the elastic member 120 is described herein with reference to the drawings.

For the rack bar support member 110 to slide on the guide member 130, with the first inclined surface 132 and the second inclined surface 112 abutting each other, the guide member 130 includes a slide recess 131, and the rack bar support member 110 includes a slide part 113.

The guide member 130 includes the slide recess 131 formed in the first inclined surface 132 in the axial direction, and the rack bar support member 110 includes the slide part 113 formed to protrude from the second inclined surface 112 and inserted to the slide recess 131.

In other words, when the first inclined surface 132 and the second inclined surface 112 abut each other, the slide part 113 of the rack bar support member 110 is inserted to the slide recess 131 of the guide member 130 (see FIGS. 5 and 6) and, when the slide part 113 slides in the slide recess 131, the rack bar support member 110 is moved in the forward direction from the guide member 130 toward the rack bar 103 by the first inclined surface 132 and the second inclined surface 112 and comes in tight contact with the rack bar 103.

As shown in the drawings, the slide recess 131 and the slide part 113 are formed in the front surface of the guide member 130 and the rear surface of the rack bar support member 110, respectively, along the axial direction, so that the first inclined surface 132 and the second inclined surface 112 may be provided on two opposite sides of the slide recess 131 and the slide part 113, respectively.

In other words, the guide member 130 includes a body part 301 opposite the rear surface of the slide part 113 and side parts 302 protruding forward from two opposite sides of the body part 301 and supported on side surfaces of the slide part 113. The body part 301 and the side parts 302 opposite each other form the slide recess 131, and the first inclined surface 132 is provided on the front surface of the side part 302 so that the side part 302 may be supported on the second inclined surface 112.

In other words, the side part 302 is formed so that the protruding height increases from one end of the guide member 130 to the opposite end, and the first inclined surface 132 is provided on the front surface thereof.

When the rack bar support member 110 slides to the opposite side along the axial direction while moving forward, the slide part 113 is spaced apart from the body part 301 (see FIG. 8) and, when the rack bar support member 110 slides to the one side along the axial direction while moving backward, the slide part 113 may be supported on the body part 301.

Meanwhile, the slide recess 131 is formed from one end of the guide member 130 to the opposite end to be longer in the axial direction than the slide part 113, and the guide member 130 includes a lower support wall 311 and an upper support wall 321 so that the slide part 113 may be supported on the lower support wall 311 or the upper support wall 321 when the rack bar support member 110 slides.

The guide member 130 includes the lower support wall 311, which closes the slide recess 131 in the axial direction, at a lower end of the first inclined surface 132.

The lower support wall 311 connects the respective ends of the two side parts opposite each other and blocks the slide recess 131 to serve as a stopper to support the rack bar support member 110 sliding on the guide member 130 in the axial direction.

The guide member 130 includes the upper support wall 321 that closes the slide recess 131 in the axial direction at a higher end of the first inclined surface 132.

The upper support wall 321 connects the respective opposite ends of the two side parts 302 opposite each other and blocks the slide recess 131 to serve as a stopper to support the rack bar support member 110 sliding on the guide member 130 in the axial direction.

In other words, when the guide member 130, the rack bar support member 110, and the elastic member 120 are assembled together, the rack bar support member 110 is elastically supported by the elastic member 120 and is supported on the upper support wall 321.

The elastic member 120 is provided between the guide member 130 and the rack bar support member 110. In other words, one end of the elastic member 120 in the axial direction is supported on the lower support wall 311, and the opposite end in the axial direction is supported on the slide part 113.

In other words, as the elastic member 120 elastically supports the rack bar support member 110 in the direction along which the second inclined surface 112 rides up the first inclined surface 132, the rack bar support member 110 slides on the guide member 130 in the axial direction while moving forward, so that the yoke part 111 comes in tight contact with the rack bar 103.

In this case, a protrusion 411 and an insertion hole 303 are provided to secure a space in which the elastic member 120 is provided between the guide member 130 and the rack bar support member 110.

In other words, the rack bar support member 110 includes the protrusion 411 projecting from the rear surface of the slide part 113, and the guide member 130 includes the insertion hole 303 formed in the slide recess 131 and allowing the protrusion 411 to be inserted thereto, so that the protrusion 411 is inserted into the insertion hole 303 when the slide part 113 is inserted into the slide recess 131.

In this case, the insertion hole 303 is formed longer in the axial direction than the protrusion 411 to allow the rack bar support member 110 to slide along the axial direction.

The rack bar support member 110 includes a first seating hole 312 depressed from the slide part 113 in the axial direction, and the other end of the elastic member 120 is inserted to the first seating hole 312.

As illustrated in the drawings, the first seating hole 312 may be formed over the slide part 113 and the protrusion 411.

The guide member 130 may include a second seating hole 412 depressed from the lower support wall 311 in the axial direction, and the one end of the elastic member 120 is inserted to the second seating hole 412. In other words, the two opposite ends of the elastic member 120 along the axial direction are inserted to the first seating hole 312 and the second seating hole 412, so that the elastic member 120 provides an elastic force in the axial direction.

Referring to FIG. 7, as the elastic force, in the axial direction, of the elastic member 120 is changed in the direction along which the rack bar 103 and the pinion shaft 102 are engaged with each other by the first inclined surface 132 and the second inclined surface 112, the rack bar support member 110 is slid by the elastic member 120 along the axial direction and moves forward to the rack bar 103 and thus comes in contact with the rack bar 103. Further, although the yoke part 111 is worn by long-term driving of the vehicle, the rack bar support member 110 may move forward as distant as the gap caused by the wear, thereby compensating for the gap between the rack bar 103 and the pinion shaft 102.

It is preferable that the slope between the first inclined surface 132 and the second inclined surface 112 is 10 degrees or less, but embodiments of the disclosure are not limited thereto, and different slopes may be formed depending on the characteristics of various types of vehicles.

The drawing is exaggerated to further clarify the height difference (h) caused when the rack bar support member 110 moves forward while sliding on the guide member 130, but in practice, the degree at which the rack bar support member 110 advances to compensate for the gap between the rack bar 103 and the pinion shaft 102 may be smaller than that shown in the drawing.

Meanwhile, referring to FIG. 8, the second seating hole 412 is formed through the lower support wall 311 in the axial direction, and an adjustment bolt 801 supported by the elastic member 120 may be screwed to the second seating hole 412.

As described above, the elastic member 120 is inserted to the first seating hole 312 and the second seating hole 412 to provide elastic force to the rack bar support member 110 in the axial direction, and the adjustment bolt 801 may be provided to adjust the elastic force of the elastic member 120.

In other words, the adjustment bolt 801 may be moved forward to pressurize the elastic member 120 to thereby increase the elastic force applied to the rack bar support member 110, or the adjustment bolt 801 may be moved back to reduce the elastic force applied to the rack bar support member 110. This may be set to differ depending on the characteristics of each type of vehicle. Or, if the yoke part 111 is further worn by a long-term driving of the vehicle, the adjustment bolt 801 may be advanced to increase the elastic force of the elastic member 120, thereby compensating for the gap between the rack bar 103 and the pinion shaft 102.

To prevent the rack bar support member 110 from escaping off the guide member 130, the rack bar support member 110 includes a protrusion 421 that projects from the slide part 113 to the other side in the axial direction, and the guide member 130 includes an insertion hole 322 formed in the upper support wall 321 to allow the protrusion 421 to be inserted thereto.

In other words, as the protrusion 421 is inserted to the insertion hole 322 when the rack bar support member 110 is supported on the upper support wall 321, the rack bar support member 110 may be prevented from escaping forward from the guide member 130, thus leading to more convenient assembly of the assembly to the housing 101.

Referring to FIG. 9, the guide member 130 may include a depression 323 in the front surface of the upper support wall 321, which is opposite the rack bar 103.

Since the upper support wall 321 is provided at the higher end of the side part 302, the middle portion of the upper support wall 321 may further project than the yoke part 111 and thus interfere with the rack bar 103. To prevent such interference, the depression 323 may be provided to allow the upper support wall 321 to be lower at the middle portion than at two opposite ends so that the upper support wall 321 does not block the yoke part 111 and thus avoids interference with the rack bar 103 when the guide member 130 and the rack bar support member 110 are coupled together.

A description is made below with reference to FIGS. 10 and 12.

The guide member 130, the rack bar support member 110, and the elastic member 120 are assembled together before mounted in the housing 101, and the assembly may then be mounted in the mounting recess 211 and fastened inside the housing 101 by the coupling member 140.

The slide part 113 is inserted to the slide recess 131 and supported on both the side parts 302, upper support wall 321, and elastic member 120, and the protrusion 421 is inserted to the insertion hole 322 so that the guide member 130, the rack bar support member 110, and the elastic member 120 are assembled together.

Such an assembly is inserted into the housing 101 in the same axial direction as the rack bar 103. Thus, assembly may be simplified, and the space occupied by the housing 101 inside the vehicle may be minimized.

The housing 101 includes the mounting recess 211 depressed in an inner surface thereof and allowing the rack bar support member 110 and the guide member 130 to be mounted therein. As illustrated in the drawings, the mounting recess 211 may be formed to correspond to the outer surface of the yoke part 111 and the rear surface and side surface of the guide member 130 and may be formed longer than the rack bar support member 110 in the axial direction so that the rack bar support member 110 is inserted into the mounting recess 211 and slid along the axial direction.

In this case, the housing 101 includes a step portion 1001 that is formed as the internal diameter of the housing 101 increases, and the mounting recess 211 may be open by the step portion 1001 in the axial direction.

The process of inserting the assembly into the mounting recess 211 is described. First of all, the assembly is positioned to allow the yoke part 111 to be supported on the rear surface of the rack bar 103, and the assembly may be slid along the rack bar 103 in the axial direction and simply inserted to the mounting recess 211.

In other words, as the rack bar support member 110 is pushed to one end along the axial direction by the friction between the rack bar 103 and the yoke part 111 and inserted to the mounting recess 211, thus eliminating the need for a separate process for inserting the assembly to the mounting recess 211.

The coupling member 140 is provided to fasten the assembly inserted to the mounting recess 211. In other words, the coupling member 140 is supported on the step portion 1001 and coupled to the housing 101, fastening the guide member 130 seated in the mounting recess 211 in the axial direction.

The step portion 1001 may be formed to have an annular shape as illustrated in the drawings and may be press-fit or screwed into the inside of the housing 101.

As the guide member 130 is fastened inside the housing 101 by the coupling member 140, one end of the elastic member 120 is supported by the guide member 130, providing an elastic force when the rack bar support member 110 slides along the axial direction.

A rack bar support device of a vehicle steering device having the above-described shape may compensate for the gap due to wear to the rack bar support member to thereby reduce noise, provide increased assembly convenience by a simplified structure, and easily secure an installation space by reducing the overall size of the steering device.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, Korean Patent Application No. 10-2018-0153355 filed on Dec. 3, 2018 is hereby incorporated by reference for all purposes as if fully set forth herein. In addition, if this patent application claims priority for countries other than the United States for the same reason as above, all the contents are incorporated into this patent application by reference.

The invention claimed is:

1. A rack bar support device of a vehicle steering device, comprising:
   a rack bar engaged with a pinion shaft;
   a guide member configured to be coupled to a housing and including a first inclined surface positioned opposite a rear surface of the rack bar;
   a rack bar support member including a yoke part supported on the rear surface of the rack bar and a second inclined surface abutting the first inclined surface; and
   an elastic member provided between the guide member and the rack bar support member to elastically support the rack bar support member in an axial direction,
   wherein the guide member includes a through hole extending in the axial direction and receiving at least a part of the elastic member.

2. The rack bar support device of claim 1, wherein the guide member includes a slide recess formed in the first inclined surface in the axial direction.

3. The rack bar support device of claim 2, wherein the rack bar support member includes a slide part protruding from the second inclined surface and inserted into the slide recess.

4. The rack bar support device of claim 3, wherein the guide member includes a lower support wall closing the slide recess in the axial direction at a lower end of the first inclined surface.

5. The rack bar support device of claim 4, wherein the guide member includes an upper support wall closing the slide recess in the axial direction at a higher end of the first inclined surface.

6. The rack bar support device of claim 5, wherein the elastic member having a first end along the axial direction, which is supported on the lower support wall, and a second end along the axial direction, which is supported on the slide part.

7. The rack bar support device of claim 6, wherein the rack bar support member includes a protrusion projecting from a rear surface of the slide part, and wherein the guide member includes an insertion hole formed in the slide recess and allowing the protrusion to be inserted thereto.

8. The rack bar support device of claim 7, wherein the rack bar support member includes a first seating hole depressed in the axial direction from the slide part, and wherein the second end of the elastic member is inserted to the first seating hole.

9. The rack bar support device of claim 8, wherein the guide member includes a second seating hole defined by the through hole extending through the lower support wall in the axial direction, and wherein the first end of the elastic member is inserted to the second seating hole.

10. The rack bar support device of claim 9, wherein an adjustment bolt supported on the elastic member is screwed to the second seating hole.

11. The rack bar support device of claim 6, wherein the rack bar support member includes a protrusion projecting from the slide part to a second end in the axial direction, and wherein the guide member includes an insertion hole formed in the upper support wall and allowing the protrusion to be inserted thereto.

12. The rack bar support device of claim 11, wherein the guide member includes a depression in a front surface of the upper support wall, which is opposite the rack bar.

13. The rack bar support device of claim 1, wherein the housing includes a mounting recess depressed in an inner surface thereof and allowing the rack bar support member and the guide member to be mounted therein.

14. The rack bar support device of claim 13, wherein the housing includes a step portion formed by an increased inner diameter of the housing, and wherein the mounting recess is open in the axial direction by the step portion.

15. The rack bar support device of claim 14, further comprising a coupling member supported on the step portion and coupled to the housing to fasten, in the axial direction, the guide member seated in the mounting recess.

16. A rack bar support device of a vehicle steering device, comprising:
   a rack bar engaged with a pinion shaft;
   a guide member coupled to a housing and including a first inclined surface positioned opposite a rear surface of the rack bar;
   a rack bar support member including a yoke part supported on the rear surface of the rack bar and a second inclined surface abutting the first inclined surface; and
   an elastic member provided between the guide member and the rack bar support member to elastically support the rack bar support member in an axial direction,
   wherein
   the guide member includes a slide recess formed in the first inclined surface in the axial direction,
   the rack bar support member includes a slide part protruding from the second inclined surface and inserted into the slide recess,
   the rack bar support member includes a protrusion projecting from a rear surface of the slide part, and
   the guide member includes an insertion hole formed in the slide recess and allowing the protrusion to be inserted thereto.

17. A rack bar support device of a vehicle steering device, comprising:

a rack bar engaged with a pinion shaft;

a guide member coupled to a housing and including a first inclined surface positioned opposite a rear surface of the rack bar;

a rack bar support member including a yoke part supported on the rear surface of the rack bar and a second inclined surface abutting the first inclined surface; and an elastic member provided between the guide member and the rack bar support member to elastically support the rack bar support member in an axial direction, wherein the guide member includes a slide recess formed in the first inclined surface in the axial direction, the rack bar support member includes a slide part protruding from the second inclined surface and inserted into the slide recess, the rack bar support member includes a protrusion projecting from the slide part to a second end in the axial direction, and the guide member includes an insertion hole formed in an upper support wall of the guide member and allowing the protrusion to be inserted thereto.

\* \* \* \* \*